Aug. 18, 1925.  
R. LOVSTROM  
LIGHT PROJECTION DISPLAY  
Filed Jan. 7 1922  
1,549,778  
2 Sheets-Sheet 1

INVENTOR,  
Richard Lovstrom,  
By Rogers, Kennedy  
& Campbell, ATTYS

Aug. 18, 1925. 1,549,778

R. LOVSTROM

LIGHT PROJECTION DISPLAY

Filed Jan. 7, 1922 2 Sheets-Sheet 2

INVENTOR,
Richard Lovstrom,
By Rogers, Kennedy
& Campbell, ATTY's

Patented Aug. 18, 1925.

1,549,778

UNITED STATES PATENT OFFICE.

RICHARD LOVSTROM, OF NEW YORK, N. Y.

LIGHT-PROJECTION DISPLAY.

Application filed January 7, 1922. Serial No. 527,783.

*To all whom it may concern:*

Be it known that I, RICHARD LOVSTROM, a subject of the King of Denmark, residing at New York, in the county of New York and State of New York, have invented certain new and useful Improvements in Light-Projection Display, of which the following is a specification, reference being had therein to the accompanying drawing.

This invention relates to the art of light projection display, for example, the projection of effects in light or color on a curtain for exhibition. Not only a novel art, system or method is involved, but a novel apparatus or machine. The purpose of the invention may be for entertainment or for interpretive purposes, and certain practical utility is possible in connection with psychical study, or even mental or eye treatment.

The main object of the present invention is to enable the projection upon a suitable curtain or background of pleasing or stirring effects in lights and shadows or colors with the production of endless variations in tone, pattern, motion and evolution of effect. I have already explained and elucidated these objects and shown an embodiment for carrying out the same, namely in my Patent 1,406,663 granted February 14, 1922, and the present case is an embodiment and involves features of improvement over the prior case. A particular object of the present case is to supplement the underlying features by novel features or elements supplemental to or in replacement of those in the prior case, for the purpose of lending greater scope and variety to the producible effects. Other and further objects and advantages of the present invention will be made clear during the hereinafter following description, or will be apparent to those conversant with the subject.

To the attainment of the objects and advantages referred to, the present invention consists in the novel art, system or method and the novel apparatus or machine herein described or illustrated, as well as the novel features of combination, arrangement, operation, construction and detail.

In the accompanying drawings Fig. 1 is what may be termed a right hand elevation of an apparatus illustrating the present improvements, with certain parts omitted or broken away to show more fully the interior mechanism.

Figure 1:
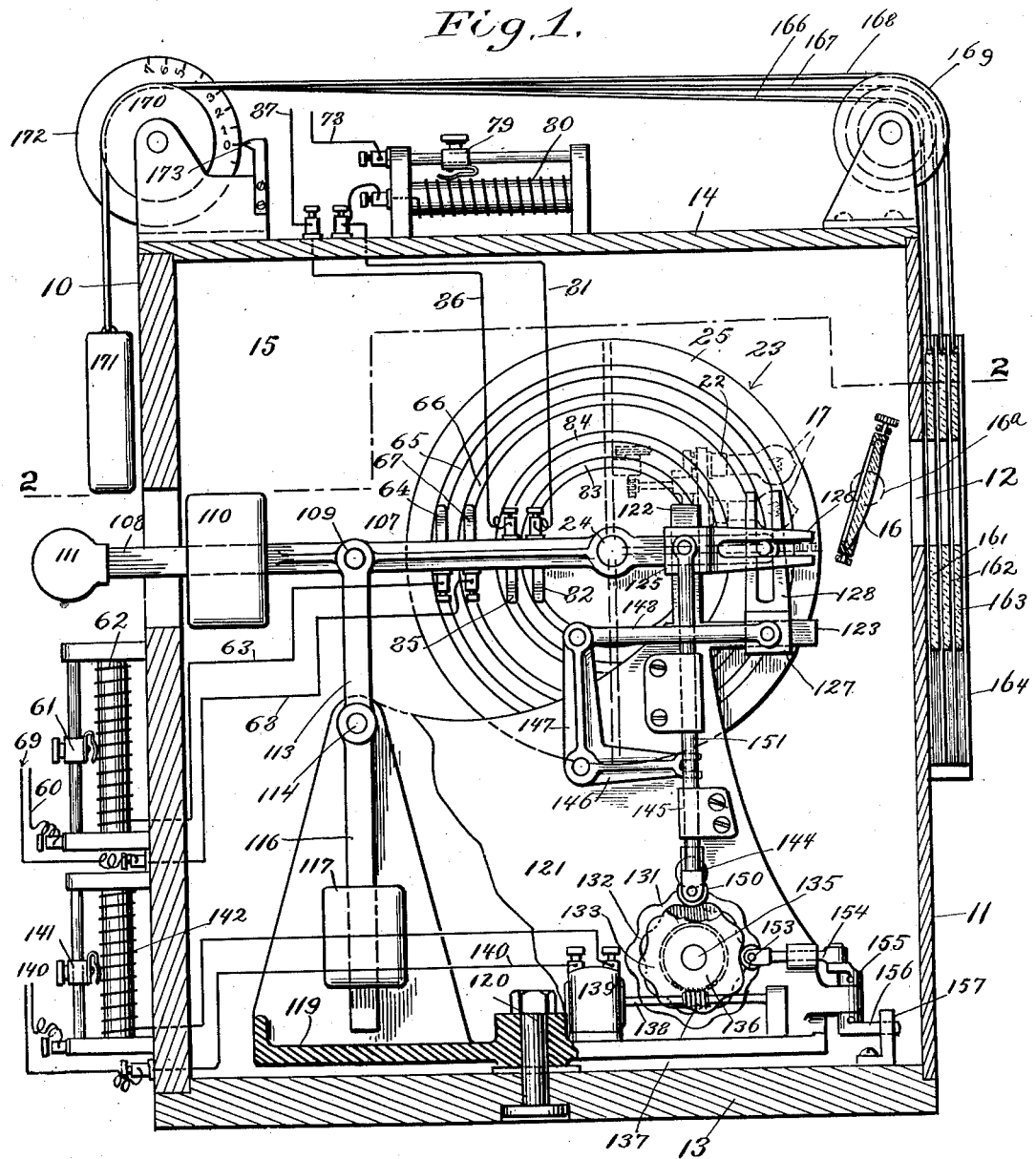

The drawings, showing one possible instance or embodiment of the apparatus hereof, capable of practicing the system, art, or method hereof, and securing the results and effects referred to, may be specifically described in detail as follows. A box, casing, or frame 10 is shown, which is preferably stationary and is supposed to be directed toward a distant curtain, by which I include a wall or any surface which is white or of light color, adapted to receive the projected effects. Within or associated with the box 10 are the lamp, the lens, the color screen device, and other operative elements involved in the present invention.

The box 10 is shown as formed with a rigid front wall 11, which is provided with an aperture 12 in front of the lamp position and in the general axial line with the lamp, lens, screens, and curtain. The box floor 13 and its top wall 14 supports certain interior elements, and the right and left sides are enclosed by side walls 15. For convenience of description, the end of the box nearest the curtain will be termed the front thereof, and the opposite end the rear. The operator may stand behind the rear of the box for controlling or operating the invention, and the terms righthand and lefthand will be taken from the point of view of such operator.

In the optical axis, behind the front wall aperture 12, is shown a lens 16, which may be of various types, such as that shown, and the shown lens may be tilted slightly out of the usual or normal position, so as to give a species of distorted projection, as described in said prior application.

As regards the lamps I have shown four selective embodiments suitable for this invention. The lamps 17, 18, 19 and 20 in the respective embodiments are each preferably of the incandescent filament type, and the filaments 21 may have the shape indicated or any other desired contour, the form of the filament affecting the optical results.

The lamps are shown not merely shiftable for adjustment into position but operatively movable both bodily and by rotation during the performance. The precise mounting of the several lamps sockets 22 will later be described.

In order to give four alternative embodiments, which may be selectively brought to position, I have shown a rotary carriage 23, the axle 24 of which is mounted to permit bodily movement, while the carriage is enabled to rotate a quarter turn to replace the lamps 17 by the lamp 18 or the latter by another form as may be desired. The carriage 23 consists of circular side walls 25 between which, and radiating from the center, are four radial partitions 26, thus giving four chambers or enclosures, any one of which may be brought opposite to the lens 16.

In the first enclosure or quadrant are shown a plurality of incandescent lamps 17, arranged symmetrically at opposite sides of the optical axis, and mounted to revolve about said axis. While more than two lamps could be used only two are shown in the first quadrant or enclosure 27$^a$ and these are both mounted on a rotary disc 28 carried on a rotating shaft 29 journaled in a bracket 30 secured to one of the walls 26. The rotation of these parts may be effected in any suitable manner, for example, from an electric motor 32 located in an adjacent enclosure 27$^b$. A belt 33 conveys rotation from the motor shaft to a pulley 34 arranged to effect the rotation of a worm 35 which gives a slow rotation to a worm wheel 36 on the shaft 29 which carries the lamp supporting disc. The wiring for the motors and lamps will be subsequently described.

In the second quadrant or enclosure 27$^b$ is a single lamp 18 arranged so that when in operative position its axis will be vertical or at right angles to the axis of projection and to rotate about its vertical axis. For this purpose the lamp is secured upon a short rotating shaft 37 mounted in a bracket 38 which in turn is supported on a larger bracket 39 attached to the walls of the enclosure. From the motor 32 extends a belt 40 which drives a pulley 41, and the shaft 42 of the pulley carries a worm 43 engaging a worm wheel 44 on the lamp shaft 37. The worm and wheel, as in the case of the lamps 17, gives a speed reduction, so that the rotary motion is slow or gradual as is usually preferable with optical effects of the class to which the present invention relates.

In the third enclosure 27$^c$ a pair of lamps 19 are shown facing in opposite directions and mounted on a carrier 46, the shaft 47 of which extends laterally or at right angles to the projection. The consequence of the described arrangement is that each lamp passes out of projecting position as the other lamp passes into position; in other words we have a slow transverse movement of one lamp followed by another across the field of projection. A motor 49 is shown from which extends a belt 50 to a pulley 51 on the shaft 47. The large size of the pulley gives a certain speed reduction.

In the fourth quadrant a single lamp 20 is arranged with its axis oblique to the axis of projection. It is fitted for rotation by being mounted on a shaft 53 journaled in a bracket 54. A belt 55 from the motor 49 drives a pulley 56 which carries a worm 57 engaging a worm wheel 58 on the lamp shaft 53.

It would be difficult, and seems unnecessary, to attempt to describe in detail the optical effects of the four different lamp arrangements. Each of them comes within the general plan or system as covered in my prior application but the projected effects, while coming under the same general class, are exceedingly different in the possible features of form and movement. The differences in effects are more than would be indicated by the mere differences in position and movement of the lamps, because the distorting effect of the oblique lens introduces intricate complications of result, while the various bodily movements of the lamp carriage, by which the filaments are carried to or from the focus point in various directions further complicate the projected effects.

Figure 3:
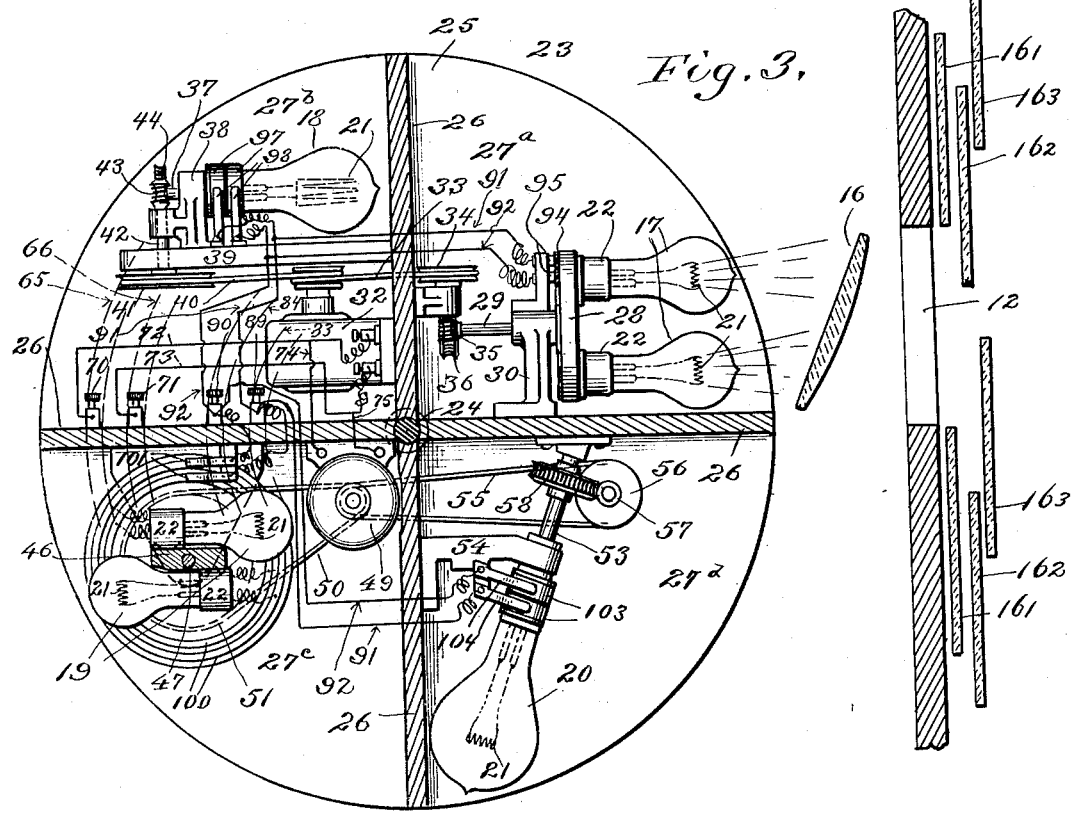
Fig. 3 is a right hand elevation on a larger scale than Fig. 1, with certain parts omitted so as to show the interior arrangement of the illuminating elements and their relation to the other optical elements of the apparatus.

The motors 32 and 49 for driving the lamps may for convenience be electrical motors in which case the circuits and connections may be as shown in Figs. 1 and 3 and described as follows. The line wire 60 is shown connected to a rheostat which may consist of a contact 61 adjustable along a resistance coil 62, from which latter extends a wire 63 to a brush or contact spring 64 which maintains contact with an annular ring 65 mounted on the exterior of the carriage 23. Within the ring 65 is a second ring 66 and these two form a collector by which a supply of current is maintained for the motors within the carriage notwithstanding any rotary motion or readjustment of the carriage. The second ring 66 is contacted by a brush 67 and from this extends a wire 68 connected to the other line wire 69. These elements are seen in Fig. 1.

On Fig. 3 are shown the interior connections. A binding post 70 is shown connected with the contact ring 65 and a similar post 71 connected with ring 66. Wires 72 and 73 are shown connecting the posts with the motor 32 and wires 74 and 75 extend to the motor 49. It will be understood that whichever motor is not in use can be thrown out of circuit by hand in any usual manner or automatically, and the same remark applies to the lamps, since it is only necessary to illuminate the lamps in the enclosure which is in operative position.

The lamp circuits include a line wire 78 extending to the contact 79 of a rheostat, the coil 80 of which is connected by a wire 81 with a brush 82 constantly in contact with a collector ring 83 on the exterior of the carriage. Alongside the ring 83 is a second ring 84 contacted by a brush 85 which is connected by a wire 86 to the other line wire 87. These elements are shown in Fig. 1. The interior connections are indicated in Fig. 3. A binding post 89 is connected with the contact ring 83 and a similar post 90 with the ring 84. A system of wires 91 extend from the post 89 to the several lamps or their collector rings, and a complementary system of wires 92 conduct the current back to the other post 90. In the enclosure 27ª a pair of contact rings 94 may be provided on the disc 28 contacted by brushes 95, connected with the wires 91 and 92, so as to maintain constant current in both lamps during rotation of the disc. In the second quadrant the lamp socket is shown as provided with a pair of contact rings 97 engaged by brushes 98 to which the wires 91 and 92 extend. In the third quadrant are indicated analogous contact rings 100 and brushes 101. In the fourth quadrant the arrangement is similar to the second, the lamp socket carrying rings 103 contacted by brushes 104 supplied by current from the wires 91 and 92.

It is intended that the lamp which is operative at any given time shall have not merely its described motions of rotation or revolution about its own axis or an adjacent axis, but in addition shall have substantially universal bodily movement along with the carriage 23. For the sake of clearness of terminology but without intending to limit the scope of the description it may be explained that the shaft, disc, or other movable member carrying the lamp or socket may be termed a carrier, this with its bracket being mounted on the circular carriage, which is divided into four enclosures, for the purposes of selective adjustment. The further mechanical elements by which the carriage is permitted to have universal movement comprise its axle, this being journaled in a movable support, which in the described embodiment is fitted for up and down and front and back movements. The carriage support in turn is mounted on a shiftable frame or base which may be slid or moved laterally to give the carriage and lamp a transverse movement, thus completing its universality. These results are shown herein effected by a very simple and workable mechanism as follows.

The axle 24 of the carriage 23 is shown mounted on a support 107, this being in the form of a pair of opposite bars extending forwardly and rearwardly and pivoted at 109. The bars are shown as having a rearward extension 108 which is provided with a counterweight 110 to offset the weight of the carriage. At its extreme rear end, exterior to the box is a handle 111 which may sometimes be used for manipulating the carriage and lamps when the mechanism hereafter described is not used. The bar 107 at its extreme forward end carries a pin or stud 112 by which the up and down and front and back movements are effected.

The support or bar 107 has its pivot 109 located at the upper end of a link or arm 113 which in turn is pivoted at 114 to the underlying frame or turret 119. The pivots 109 and 114 are transverse so that by the swinging of the link 113 the support or bar and carriage may be moved forwardly and rearwardly. The link 113 may have an extension 116 for the purpose of carrying a counterweight 117 to give greater stability to the mounting of the carriage.

The frame or base 119 may be in the form of a slide or turret mounted, for example by a pivot stud 120, so that the forward side of the frame may be shifted laterally and thereby give lateral movements to the carriage and lamp. The turret comprises an upright wall 121 which at its forward upper portion has two extensions or guides 122 and 123, the first of which extends upwardly and the latter forwardly. The guide 122 is preferably squared and gives support to a collar or slide 125 which thus can be moved upwardly and downwardly. This slide forms a part of a fork 126, which extends to the right from the slide, and straddles the pin or stud 112 which is mounted at the forward end of the support or bar 107. By this, when the slide and form are raised the stud, bar and carriage, are raised. The other extension or guide 123 carries a slide or collar 127 formed with a fork 128 extending upwardly and straddling the pin 112 of the supporting bar. By moving the fork 128 forwardly or rearwardly the bar and carriage are moved similarly.

For automatically performing these up and down and front and rear movements of the carriage and also the transverse movements of the turret or base, thus giving movement of lamp in all dimensions, various forms of mechanism may be employed. Preferably the movements are to be slow and methodical, for example, synchronized to give certain predetermined results, or in some cases left to chance, or to the judgment and skill of the performer.

I have herein shown a series of three synchronized cams arranged to effect the three respective movements. The cam 131 effects the front and back movements. The cam 132 controls the up and down movements.

The cam 133 controls the transverse movements. The three cams are mounted on a shaft 135 supported in the opposite walls of the base or turret. The shaft carries a worm wheel 136 slowly revolved by a worm 137 mounted on the shaft 138 of a motor 139. The circuit 140 by which the motor is operated comprises a rheostat 141, 142 similar to those previously described, so that the speed of the motor and the cams can be controlled at will.

The connections from cam 131 to produce forward and rearward movements of the carriage and lamp comprise a roller 144 at the lower end of a vertical slide bar 145, the upper end of which engages the horizontal arm 146 of a bell crank, the vertical arm 147 of which is connected by a link 148 to the slide 127 carrying the fork 128 through which the pin 112 and carriage are moved forwardly and rearwardly.

The up and down movements are effected from the cam 132 through a cam roll 150 mounted at the lower end of a rod 151, the upper end of which is secured directly to the slide 125 which carries the fork 126 that moves the pin and carriage up and down. The cam 133 produces transverse movements by its engagement with cam roll 153 carried on a short rod 154 which operates the arm 155 of a bell crank lever, the arm 156 of which cooperates with a fixed fork or slotted member 157. The result is that when the cam causes the bell crank to swing this bodily throws the forward side of the turret to right or left and correspondingly swings the forward side of the carriage and the lamp, contained therein. The cam 133, and in fact any or all of the three cams, may be interchanged for others at will, or may be adjusted on the cam shaft to give different relative timing, or all the cams may be omitted in case it is desired to manipulate the lamp by the handle or knob 111.

The various effects of form, pattern, motion and evolution produced by the several lamp devices and the inclined lens may be endlessly modified by a color device for example similar to that shown in my prior patent. The color screen device is shown located in front of the front wall 11. Three color screens 161, 162 and 163 are shown of yellow, red and blue respectively and each consists of upper and lower portions so that the color may be introduced into the light beam either from above or below. These screens may slide in a simple frame 164 and their manipulation may be as shown in Fig. 1 through a series of cords 166, 167 and 168 passing over idle pulleys 169 to separate pulleys 170 at the rear upper part of the apparatus, the cords at their ends having counter weights 171, and the pulleys 170 having operating and graduated discs 172 by which the operator may manipulate the cords and screens, the graduations cooperating with index fingers 173 so that the positions may be determined without inspection of the screens themselves.

As with my aforesaid prior application, now Patent Number 1,406,663, the present invention is novel not merely in its apparatus but in its method and results and I consider that with my inventions a new art has been created. It may be considered as a musical performance by the use of light instead of sound, the "luminous music" serving the purposes of entertainment, etc. as already set forth. Considered as an art or method the invention in one aspect consists in throwing moving and luminous forms upon a curtain, preferably by the aid of a filamentary source of light and an unsymmetrical lens, and under the control of an artist or performer, a methodical motion as between the source of light and the lens being maintained, and the performer producing artistic interpretive or other effects by reason of his control of the several factors involved in the projected effects. The illustrated apparatus may be considered as an organ employing light instead of sound, the same, through its several devices, being manipulated by the performer or artist who may indeed be guided by a written notation, analogous to musical notation, and through which a given performance can be repeated by reason of the indicated control of the several devices and factors involved in the projected performance. I have in fact developed such a system of notation, and through it am enabled to duplicate a pleasing performance by manipulating the several control devices in accordance with the notation. The art or method however is broadly independent of the particular system of notation, which I have adopted, and I therefore do not illustrate the same herein. Indeed a perforated music roll might be employed, analogous to that in self playing pianos, with suitable connection for effecting predetermined control of all of the factors involved in performing by the present art or method.

Figure 2:
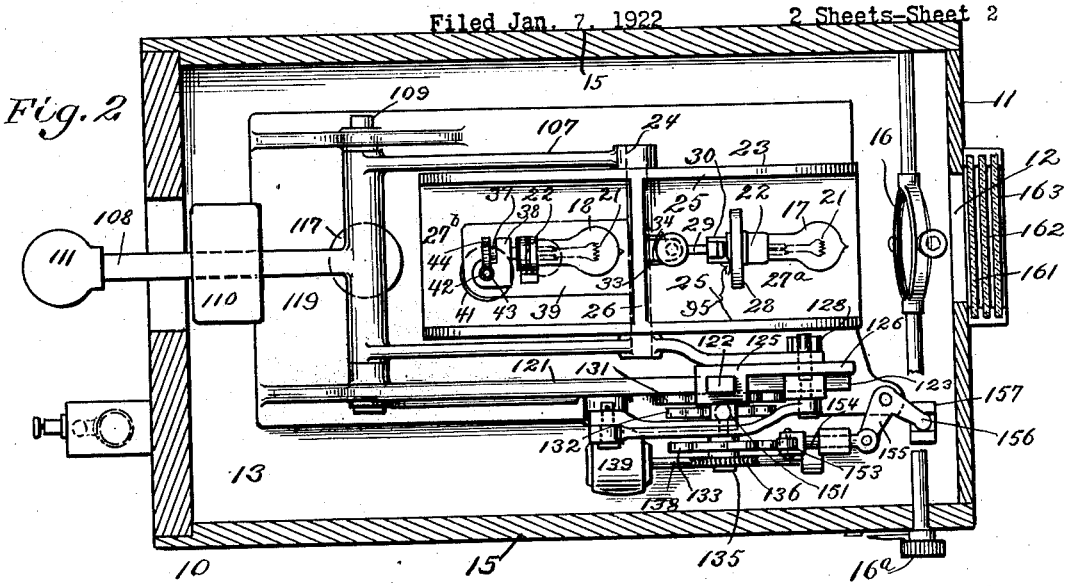
Fig. 2 is a section taken on the line 2—2 of Fig. 1.

The five principal factors may be enumerated as follows. First, the intensity of the illumination is controllable, by regulating the current through the filaments of the lamps, and the performer does this through the rheostat 79, 80. Second, the individual motion or rotation of the projecting lamps or filaments, the speed of which is controllable by the rheostat 61, 62. Third, the bodily movement of the lamps and carriage, for example with a predetermined three dimensional motion as explained, the speed of which is controllable by the rheostat 141, 142. The interchangeability of the three cams, or the possibility of their separate control, or the possible manual manipulation of the lamp, permit indefinite further variation of motion. Fourth, the introduction of color and the shifting of the colors into and out of the field of projection, giving innumerable combinations of white, yellow, red, blue and mixtures, controllable by the three graduated color wheels 172. Fifth, the tilt of the lens, and the distortion of the projection are readily controlled by adjustment, or during the performance, by any suitable connection such as in the prior case, or the thumb nut 16ª in Fig. 2 hereof. I prefer a filamentary source of light rather than an arc or flame because the filament has a shape or contour which gives forms and effects impossible with the others. Various forms of filament may be used and I have shown several in the prior case and this. In one sense the projection on the curtain is a moving image of the incandescent filament. But the filament is for the greater part out of focus, the part which is in focus throwing a relatively clear image on the curtain, the remainder of the filament throwing more or less blurred images, the whole constantly changing as the filament moves through the focal plane of the lens, giving motions of merging, emerging, evolving, flowing, gyrating, etc. which have proved highly interesting and entertaining and are capable of being made to interpret or represent or produce certain emotions or mental impressions.

Many modifications and variations of the illustrated method and apparatus are possible. Instead of a single projection it is possible to employ two apparatuses and superpose one projection upon another with added complications of effect. In front of the apparatus may be employed simple colored lights to suffuse the entire curtain with a deep color, forming a more interesting background than a simple black. Opaque forms may be moved through the path of projection to cause shadow effects. Any given projection can be symmetrically duplicated or multiplied on the curtain by means of systems of mirrors between the lens and curtain. Certain of these modifications are already illustrated in my prior application.

It will thus be seen that I have described a novel art, system or method of light projection display, as well as a novel apparatus or machine for carrying out such art, embodying the principles and attaining the purpose of the present invention. Since many matters of operation, arrangement, construction, combination and detail may be variously modified without departing from the underlying principles, it is not intended to limit the invention to such matters except in so far as specified in the appended claims.

What is claimed is:

1. Light projection display apparatus comprising a projecting lens, a shiftable carriage behind the lens having a number of sections, and in each section a lamp device, each lamp device having a different relation to the carriage and lens, and the several lamp devices being selectively shiftable to projecting position by the shift of the carriage.

2. Apparatus as in claim 1 and wherein the carriage shift is a rotary motion about its axis for selective purposes, and the carriage additionally is mounted for bodily movements during projection.

3. Apparatus as in claim 1 and wherein the carriage, besides its selective shifting movement, is mounted for bodily movements toward and from the lens and transversely to the line of projection.

4. Apparatus as in claim 1 and wherein the carriage is movably mounted above a frame, the frame fitted for transverse movements, and the carriage fitted on the frame for movements toward and from the lens.

5. Apparatus as in claim 1 and wherein each lamp device is arranged for operative movements in relation to the carriage during projection.

6. In an apparatus of the kind referred to, a projecting lens, and a lamp device behind the lens comprising two filamentary lamps mounted on a carrier and means for rotating the carrier during projection, whereby the changing images of both filaments are projected.

7. In an apparatus of the kind referred to, a projecting lens, and a lamp device behind the lens comprising a filamentary lamp arranged at right angles to the line of projection and means to rotate the lamp during projection, whereby the image of the filament is projected with changing effects.

8. In an apparatus of the kind referred to, a projecting lens, and a lamp device behind the lens comprising two filamentary lamps mounted on a rotating carrier in such way that the lamps pass alternately across the line of projection for the projection of changing images of their filaments, and means for rotating said carrier.

9. In an apparatus of the kind referred to, a projecting lens, and a lamp device behind the lens comprising a filamentary lamp set at an oblique angle to the line of projection and fitted to rotate about its own axis during projection, for changing projection of the filament image, and power driven means for rotating said lamp.

10. In an apparatus of the kind referred to, a projecting lens, a swinging lamp support behind the lens, arranged to be movable up and down and front and rear, a frame bearing said support, the frame movable left and right, means for moving said frame left and right, and a filamentary lamp device arranged on the support for changing projection of the filament image.

11. In an apparatus of the kind referred to, a projecting lens, a swinging lamp support behind the lens, arranged to be movable up and down and front and rear, a rotatable turret bearing said support, the turret movable left and right, and a filamentary lamp device arranged on the support for changing projection of the filament image.

12. In an apparatus of the kind referred to, a projecting lens, a lamp support behind the lens, arranged to be movable up and down, front and rear, and left and right, a filamentary lamp device arranged on the support for changing projection of the filament image, and control mechanism arranged to effect predetermined movements of the three kinds mentioned.

13. In an apparatus of the kind referred to, a projecting lens, a swinging lamp support behind the lens, arranged to be movable in a given manner in relation to the element on which it is mounted, a rotatable turret on which said lamp support is movably mounted, the said turret bodily movable in a different manner from the movement of said lamp support, and a filamentary lamp device arranged on the support for changing projection of the filament image.

14. An apparatus as in claim 13 and wherein the turret is movable right and left, and the lamp support up and down and front and back.

15. An apparatus as in claim 13 and wherein is a motor driven cam mechanism carried by the turret, with timed connections for effecting the stated movements.

16. In an apparatus of the kind referred to, a projecting lens, a lamp, a lamp carriage, fittings permitting the bodily movement of lamp and carriage in three dimensions, and timed mechanism for effecting predetermined carriage movements in the three dimensions.

17. In an apparatus of the kind referred to, a projecting lens comprising a filamentary lamp adapted to have its filament image projected, a light source behind the lens, one or more shiftable color screens, rotary wheels having connections for shifting the screens, and an index for determining the position of each wheel and screen.

In testimony whereof, I have affixed my signature hereto.

RICHARD LOVSTROM.